United States Patent Office 2,824,880
Patented Feb. 25, 1958

2,824,880

PROCESS FOR THE MANUFACTURE OF ANTHRAQUINONE FROM ANTHRACENE BY CATALYTIC OXIDATION

Walter Wettstein, Kaiseraugst, Switzerland, assignor to Ciba Limited, Basel, Switzerland No Drawing. Original application April 5, 1954, Serial No. 421,159. Divided and this application June 7, 1955, Serial No. 516,799

Claims priority, application Switzerland April 10, 1953

7 Claims. (Cl. 260—385)

Numerous processes are known for the catalytic oxidation of organic compounds. Most of these processes use oxides of vanadium as catalysts either alone, on an inert carrier or in the form of metal vanadates. The best known large scale commercial processes are the oxidation of naphthalene to phthalic anhydride, of benzene to maleic acid and of anthracene to anthraquinone. In the first two of these processes the first stage of the reaction involves additive combination with oxygen followed by the loss of one atom of hydrogen for every oxygen atom additively combined, so that, for example, in the case of naphthalene, naphthoquinone is formed. Immediately after this first stage the oxidized aromatic ring is split up so that the final product contains at most a very small concentration of naphthoquinone and preponderating quantities of phthalic anhydride. In contradistinction thereto, in the case of the oxidation of anthracene the reaction substantially ceases after the absorption of oxygen. Having regard to the close relationship between naphthalene and anthracene it would be expected that also in the case of anthracene subsequent ring splitting would be observed to some extent depending on the activity of the catalyst and the reaction temperatures, concentrations, etc. In fact a commercial catalyst used for the oxidation of naphthalene, and consisting of vanadium pentoxide on silica gel and potassium sulfate, when used at 350–370° C. leads to the formation of 10–20 percent of phthalic anhydride in addition to anthraquinone, which naturally reduces the yield of anthraquinone to a considerable extent. It has indeed been proposed in German Patent No. 349,089, first patent of addition to German Patent No. 347,610, to use in the aforesaid reaction a substantially milder catalyst than that described in the parent patent, that is to say heavy metal vanadates instead of vanadium pentoxide. As examples there are mentioned copper vanadate and silver vanadate. Furthermore, the use of ferric vanadate is also known for the reaction in question (Fiat Final Report No. 1313, I, =P. B. 85,172, page 332). With these catalysts yields amounting to about 92–95 percent of the theoretical yield are obtained according to P. B. 73831, volume II, pages 4685–4686.

The present invention is based on the observation that vanadium catalysts, which are especially suitable for the catalytic oxidation of anthracene to anthraquinone, are obtained by incorporating with a vanadic acid or vanadium oxide catalyst a basic compound of an alkali metal or alkaline earth metal, a basic salt of an alkali metal or alkaline earth metal with a volatile acid, ammonia or a volatile amine in a proportion insufficient to form a metavanadate.

As basic compounds and salts of volatile acids there may be used in accordance with the invention basic salts, hydroxides or oxides of alkali metal or alkaline earth metals. There may be mentioned, for example potassium carbonate, calcium bicarbonate, barium hydroxide, potassium hydroxide, magnesium oxide and calcium oxide. Especially suitable are compounds of metals having an atomic weight higher than 23. There are advantageously used potassium or magnesium compounds. There may also be used salts of strong inorganic acids, such as hydrochloric acid or nitric acid, which give up the acid residue only at a high temperature. An alkali vanadate may also be used as a basic compound.

Advantageously the active mass consisting of vanadium oxide or vanadic acid and the alkaline addition is applied to an inert carrier. As such carriers there may be mentioned, for example, kieselguhr, aluminum hydroxide, aluminum oxide, iron oxides, tin dioxide, pumice powder and the like. Furthermore, there may also be added stable high melting neutral salts, such as potassium sulfate or potassium phosphates. Potassium sulfate may even be used in a preponderating quantity to serve as a diluent.

In order to form a stationary catalyst bed the catalyst should obviously be in the form of pieces. This can be accomplished in various ways. Thus, for example, the mixture of the active mass, carrier and diluent may be finely ground, compressed into pellets, and activated by heating the pellets in a current of air. Alternatively, the vanadic acid may first be precipitated on the carrier, then ground in admixture with the diluent and alkali, compressed into pellets, and the latter finally activated by being roasted in a current of air. Furthermore, the mixture may be ground or mixed with a suitable liquid to convert it into a fine suspension which is applied by spraying on to a preformed carrier, such as pieces of pumice or fragments of pottery, or the mixture may be worked up with a small quantity of liquid to form a kneadable paste and shaped in an extrusion press or through a perforated plate. In all cases it is of advantage to heat the pieces before they are used with air at least at the reaction temperature of the oxidation process, in order to avoid subsequent shrinkage. Indeed, it is often desirable to roast the pieces at a temperature considerably higher than the reaction temperature, in order to impart adequate mechanical strength to the pieces. When the vanadic acid is precipitated on to a support from a solution of an alkali vanadate by means of a mineral acid, it is to be noted that the vanadic acid precipitated from the weakly acid solution of the alkali salt contains alkali. The quantity of alkali present in the precipitate must be taken into account in determining the quantity of alkali to be added in connection with the sensitivity of the catalyst referred to below. When the contact masses are formed by compressing a paste or by spraying a suspension on a carrier, the liquid used must be so chosen that the constituents of the catalyst suspended therein are only slightly soluble in the liquid, as otherwise the dissolved constituents would close the pores of the pieces after drying.

The proportion of the alkaline addition has a very considerable influence on the activity of the catalyst. In order to avoid the formation of phthalic anhydride in the oxidation of anthracene there is advantageously present at least 0.4 equivalent of an alkali compound, that is to say, 0.2 mol of an alkali carbonate, 0.4 mol of an alkali hydroxide or 0.2 mol of magnesium oxide, for every atomic proportion of vanadium present in the vanadic acid or vanadium oxide. It is of advantage to use 0.5 to 0.7 equivalent of alkali per atomic proportion of vanadium. If this proportion is exceeded the suitability of the catalyst for promoting the formation of anthraquinone rapidly diminishes. When 1.0 equivalent of alkali is added, that is to say when the composition is equivalent to that of an alkali meta-vanadate, the catalyst is unsuitable for the production of anthraquinone on a large commercial scale.

The following examples illustrate the invention, the parts being by weight unless otherwise stated, and the relationship of parts by weight to parts by volume being the same as that of the kilogram to the liter:

Example 1

25 parts of caustic potash of 100 percent strength are boiled with 50 parts of water and 35 parts of ammonium vanadate, while stirring, until the evolution of ammonia ceases, then the mass is diluted with 340 parts by volume of water, and neutralized at 80° C. with a solution of 19.29 parts of concentrated sulfuric acid of 98 percent strength in 80 parts by volume of water until the mixture has a pH value of 3. The whole is then heated to 90° C. and 42 parts of red iron oxide are added as carrier. The precipitate, which contains about 98 percent of the vanadium used, is filtered off, washed and dried in vacuo.

The dried precipitate is finally ground in a ball mill with 73 parts of potassium sulfate, 5.2 parts of potassium carbonate and 5.6 parts of graphite, the mixture is compressed into cylindrical pellets 7 mm. in diameter and 7 mm. long, and the pellets are roasted at 460–500° C., in a current of air for 3 hours. The finished catalyst is in the form of bodies of good mechanical strength. Taking into account the alkali present in the precipitate (which can be calculated from the difference between the number of equivalents used of caustic potash on the one hand, and sulfuric acid on the other), the finished catalyst contains 0.47 equivalent of alkali per atomic proportion of vanadium.

The bodies are charged into a contact furnace and a current of air which contains about 10 grams of anthracene per cubic meter is passed at 370–380° C. through the catalyst at the rate of 1.8 cubic meters per hour per liter of space occupied by the catalyst. Anthraquinone is obtained in a yield of about 90 percent of the theoretical yield. Only traces of phthalic anhydride are formed.

Example 2

940 parts of potassium carbonate of 95 percent strength are ground in a ball mill for 4 hours with 2340 parts of ammonium meta-vanadate and 2500 parts of commercial aluminum hydroxide calcined at 500° C. Then 6000 parts of commercial potassium sulfate and 400 parts of graphite are added, and the whole is stirred for 16 hours. The powder is then slightly moistened with 300 parts by volume of methanol, 50 parts by volume of water and 20 parts by volume of glycerine, the mixture is compressed into cylindrical pellets 7 mm. in diameter and 7 mm. long, and the pellets are roasted in a current of air for 2 hours at 500° C. and one hour at 590° C.

The pellets are charged into a contact furnace and a current of air containing 11–12 grams of anthracene per cubic meter is passed through the catalyst at the rate of 1.8 cubic meters per hour per liter of space occupied by the catalyst at 360° C. Anthraquinone is obtained in a yield amounting to 93 percent of the theoretical yield calculated on the anthracene introduced. Phthalic acid can be detected only in the traces in the final product.

Instead of aluminum hydroxide, kieselguhr may be used as carrier.

For the preparation of the catalyst also vanadium oxide may be used.

Example 3

1 part of the powder obtained as described in the first paragraph of Example 2 is stirred with 1 part by volume of methanol to form a thin magma, and the latter is mixed with 3 parts by volume of pieces of pumice of a size ranging from that of peppercorns to peas. The methanol is then evaporated while gently stirring the mixture, and the powder is applied to pumice and fixed thereon by roasting at 500–560° C. The resulting catalyst can be used with equal success, instead of the catalyst described in Example 2.

Example 4

The procedure is the same as that described in Example 2, except that, instead of potassium carbonate, there is used an equivalent quantity of magnesium oxide or magnesium carbonate. In this manner a catalyst having similar properties is obtained.

The present application is a division of copending application, Serial No. 421,159, filed April 5, 1954.

What is claimed is:

1. A process for the manufacture of anthraquinone from anthracene by catalytic oxidation, which comprises catalytically oxidizing anthracene in the presence of an oxidation catalyst containing a vanadium compound selected from the group consisting of vanadic acid and vanadium oxide, said vanadium compound being incorporated with a metal compound selected from the group consisting of alkali metal oxides, alkali metal hydroxides, alkali metal vanadates, salts of an alkali metal with a volatile acid, alkaline earth metal oxides, alkaline earth metal hydroxides, alkaline earth metal vanadates and salts of an alkaline earth metal with a volatile acid in a proportion of 0.4 to 0.7 equivalent of said metal compound per atomic proportion of vanadium present.

2. A process for the manufacture of anthraquinone from anthracene by catalytic oxidation, which comprises catalytically oxidizing anthracene in the presence of an oxidation catalyst containing a vanadium compound selected from the group consisting of vanadic acid and vanadium oxide, said vanadium compound being incorporated with potassium hydroxide in a proportion of 0.4 to 0.7 equivalent of the latter per atomic proportion of vanadium present.

3. A process for the manufacture of anthraquinone from anthracene by catalytic oxidation, which comprises catalytically oxidizing anthracene in the presence of an oxidation catalyst containing a vanadium compound selected from the group consisting of vanadic acid and vanadium oxide, said vanadium compound being incorporated with potassium carbonate in a proportion of 0.4 to 0.7 equivalent of the latter per atomic proportion of vanadium present.

4. A process for the manufacture of anthraquinone from anthracene by catalytic oxidation, which comprises catalytically oxidizing anthracene in the presence of an oxidation catalyst containing a vanadium compound selected from the group consisting of vanadic acid and vanadium oxide, said vanadium compound being incorporated with magnesium oxide in a proportion of 0.4 to 0.7 equivalent of the latter per atomic proportion of vanadium present.

5. A process for the manufacture of anthraquinone from anthracene by catalytic oxidation, which comprises catalytically oxidizing anthracene in the presence of an oxidation catalyst containing a vanadium compound selected from the group consisting of vanadic acid and vanadium oxide, said vanadium compound being incorporated with magnesium carbonate in a proportion of 0.4 to 0.7 equivalent of the latter per atomic proportion of vanadium present.

6. A process for the manufacture of anthraquinone from anthracene by catalytic oxidation which comprises catalytically oxidizing anthracene in the presence of an oxidation catalyst containing a vanadium compound selected from the group consisting of vanadic acid and vanadium oxide, said vanadium compound being incorporated with a metal compound selected from the group consisting of alkali metal oxides, alkali metal hydroxides, alkali metal vanadates, salts of an alkali metal with a volatile acid, alkaline earth metal oxides, alkaline earth metal hydroxides, alkaline earth metal vanadates and salts of an alkaline earth metal with a volatile acid in a proportion of 0.4 to 0.7 equivalent of said metal compound per atomic proportion of vanadium present, the vanadium compound and the incorporated metal compound being deposited on an inert carrier.

7. A process for the manufacture of anthraquinone from anthracene by catalytic oxidation, which comprises catalytically oxidizing anthracene in the presence of an oxidation catalyst containing a vanadium compound selected from the group consisting of vanadic acid and vanadium oxide, said vanadium compound being incorporated with a metal compound selected from the group consisting of alkali metal oxides, alkali metal hydroxides, alkali metal vanadates, salts of an alkali metal with a volatile acid, alkaline earth metal oxides, alkaline earth metal hydroxides, alkaline earth metal vanadates and salts of an alkaline earth metal with a volatile acid in a proportion of 0.4 to 0.7 equivalent of said metal compound per atomic proportion of vanadium present, the vanadium compound and the incorporated metal compound being deposited on an inert carrier which contains a stable and infusible alkali metal salt of a strong non-volatile inorganic acid.

References Cited in the file of this patent

UNITED STATES PATENTS

| | | |
|---|---|---|
| 1,880,322 | Jaeger | Oct. 4, 1932 |
| 2,081,272 | Foster | May 25, 1937 |
| 2,209,908 | Weiss | July 30, 1940 |